United States Patent
Hallek et al.

(10) Patent No.: US 11,424,954 B2
(45) Date of Patent: Aug. 23, 2022

(54) METHOD FOR OPERATING A SENSOR ARRANGEMENT IN A MOTOR VEHICLE ON THE BASIS OF A DSI PROTOCOL

(71) Applicant: Valeo Schalter und Sensoren GmbH, Bietigheim-Bissingen (DE)

(72) Inventors: Michael Hallek, Bietigheim-Bissingen (DE); Marek Lewandowski, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 0 days.

(21) Appl. No.: 16/973,865

(22) PCT Filed: May 27, 2019

(86) PCT No.: PCT/EP2019/063563
§ 371 (c)(1),
(2) Date: Dec. 10, 2020

(87) PCT Pub. No.: WO2019/238395
PCT Pub. Date: Dec. 19, 2019

(65) Prior Publication Data
US 2021/0184888 A1    Jun. 17, 2021

(30) Foreign Application Priority Data

Jun. 14, 2018    (DE) .................... 10 2018 114 225.0

(51) Int. Cl.
*H04L 12/40*    (2006.01)
*H04L 67/12*    (2022.01)

(52) U.S. Cl.
CPC .......... *H04L 12/4013* (2013.01); *H04L 67/12* (2013.01); *H04L 2012/40273* (2013.01)

(58) Field of Classification Search
CPC ................ H04L 12/4013; H04L 67/12; H04L 2012/40273; H04L 12/403
See application file for complete search history.

(56) References Cited

U.S. PATENT DOCUMENTS 7,852,230 B2 * 12/2010 Billo ........................ H04B 3/54
340/12.15
8,612,657 B2 * 12/2013 Lance .................. G06F 13/364
710/110

(Continued)

FOREIGN PATENT DOCUMENTS

DE    102005054390 A1    5/2007
DE    102012103907 A1    11/2013

(Continued)

OTHER PUBLICATIONS

DSI Bus Standard Version 2.5, 16. Apr. 2009, Gefunden im Internet: URL:https://www.dsiconsortium.org/downloads/DSI_2.5_20090416.pdf (20 pages).

(Continued)

*Primary Examiner* — Jay P Patel
(74) *Attorney, Agent, or Firm* — Osha Bergman Watanabe & Burton LLP

(57) ABSTRACT

The invention relates to a method for operating a sensor arrangement (2) in a motor vehicle (1) based on a DSI protocol, wherein
the sensor arrangement (2) has a central processing unit (3) as a master and a plurality of sensor units (S1, S2, S3) as slaves controlled by the master,
the central processing unit (3) and the sensor units (S1, S2, S3) are connected to a bus line (4) and
communication between the central processing unit (3) and the sensor units (S1, S2, S3) takes place via the bus line (4),
characterized by the following method steps:

(Continued)

Figure 1:
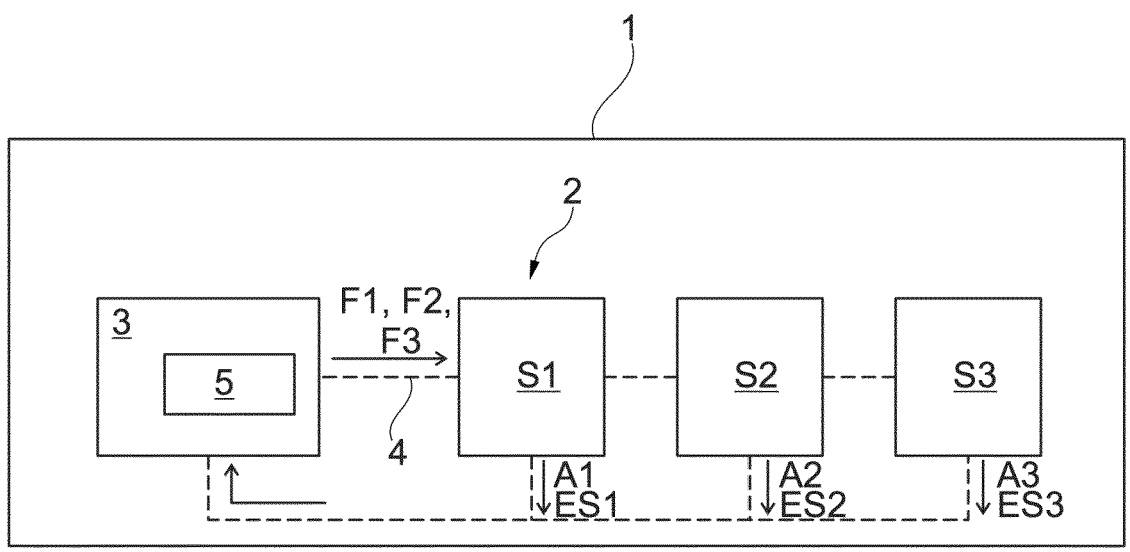

sending a first message from the central processing unit (3) to a first sensor (S1) and subsequently sending a second message from the central processing unit (3) to a second sensor (S2) without the central processing unit (3) waiting to receive a response message from the first sensor (S1). In this way, such a method for operating a sensor arrangement (2) in a motor vehicle (1) is provided in which communication between the master and the slaves is regularly possible at a high payload data rate while at the same time ensuring a predetermined ASIL level.

12 Claims, 2 Drawing Sheets

(56) References Cited

U.S. PATENT DOCUMENTS

| | | | | |
|---|---|---|---|---|
| 8,762,612 | B2* | 6/2014 | Sugiura | H04L 12/403 |
| | | | | 710/110 |
| 2006/0079971 | A1* | 4/2006 | Billo | H04B 3/54 |
| | | | | 700/90 |
| 2009/0121776 | A1* | 5/2009 | Nagase | H04L 12/40182 |
| | | | | 327/434 |
| 2011/0093739 | A1 | 4/2011 | Bernon-Enjalbert et al. | |
| 2011/0125945 | A1* | 5/2011 | Link | H04L 12/10 |
| | | | | 710/110 |
| 2011/0138090 | A1* | 6/2011 | Lance | H04L 25/4902 |
| | | | | 710/110 |
| 2011/0208886 | A1* | 8/2011 | Sugiura | H04L 12/403 |
| | | | | 710/110 |
| 2013/0317701 | A1* | 11/2013 | Ooyabu | B60R 21/013 |
| | | | | 701/45 |
| 2014/0163835 | A1* | 6/2014 | Wellhoefer | B60T 8/368 |
| | | | | 701/70 |
| 2014/0358377 | A1* | 12/2014 | Hammerschmidt | B60R 21/01 |
| | | | | 701/45 |
| 2015/0249078 | A1* | 9/2015 | Cao | H01L 27/0255 |
| | | | | 257/546 |
| 2015/0261704 | A1* | 9/2015 | Vaccaro | G06F 13/364 |
| | | | | 710/114 |
| 2017/0050588 | A1* | 2/2017 | Hammerschmidt | H04L 12/40026 |
| 2017/0163366 | A1* | 6/2017 | Aichriedler | H04Q 9/04 |
| 2018/0209820 | A1* | 7/2018 | Hammerschmidt | G01D 5/2454 |
| 2018/0237028 | A1* | 8/2018 | Hammerschmidt | B60W 50/0205 |
| 2019/0250610 | A1* | 8/2019 | Luo | G05D 1/0246 |
| 2019/0250611 | A1* | 8/2019 | Costin | H04N 7/102 |
| 2020/0241130 | A1* | 7/2020 | Lewandowski | G08C 19/00 |

FOREIGN PATENT DOCUMENTS

| | | | |
|---|---|---|---|
| DE | 102013226376 A1 | 6/2015 | |
| DE | 102017103117 A1 | 8/2018 | |
| DE | 102017118574 A1 | 2/2019 | |
| DE | 102018112587 A1 * | 11/2019 | H04L 12/40 |
| EP | 2263102 B1 | 8/2013 | |
| EP | 3573290 A1 * | 11/2019 | H04L 12/40 |
| WO | 2016054345 A1 | 4/2016 | |

OTHER PUBLICATIONS

DSI Consortium (Denso Corporation, Freescale Semiconductor Inc., TRW Automotive Inc.): Norm DSI3 Bus Standard—Revision 1.00, Feb. 16, 2011. S. 1-45. URL: http://www.dsiconsortium.org/downloads/DSI3_%20Bus_Standard_r1.00.pdf (45 pages).

International Search Report and Written Opinion in corresponding International Application No. PCT/EP2019/063563, dated Jul. 31, 2019 (12 pages).

German Search Report in corresponding German Application No. 10 2018 114 225.0, dated Mar. 15, 2019 (8 pages).

* cited by examiner

METHOD FOR OPERATING A SENSOR ARRANGEMENT IN A MOTOR VEHICLE ON THE BASIS OF A DSI PROTOCOL

The invention relates to a method for operating a sensor arrangement in a motor vehicle on the basis of a DSI protocol, wherein the sensor arrangement has a central processing unit as a master and a plurality of sensor units as slaves controlled by the master, the central processing unit and the sensor units are connected to a bus line and communication between the central processing unit and the sensor units takes place via the bus line. The invention also relates to the use of such a method in a motor vehicle, a sensor arrangement and a vehicle having such a sensor arrangement.

In the automotive sector, the DSI3 bus and the DSI protocol can be used for communication with sensors in vehicles. The DSI Protocol Distributed System Interface, see: DSI3 Bus Standard, Revision 1.00 dated 16 Feb. 2011, the specification of which hereby forms part of the disclosure of the present invention by explicit incorporation, is a protocol that allows a sensor network in which a master communicates with one or more slaves via a bus line to be built on the basis of a simple two-wire cable arrangement. The DSI protocol is based primarily on use in motor vehicles, in order to use the master to poll and/or control a plurality of slaves, in particular sensors and actuators.

The specification of the DSI protocol stipulates that such a sensor arrangement can be operated in one of two operating classes, these being firstly the "Signal Function Class" and secondly the "Power Function Class". The protocol also stipulates essentially three different ways in which the bus between the master and the slaves can be used:

In the CRM mode (Command and Response mode) a bidirectional communication takes place between the master and the slaves. The master sends a command (Command), to which the slaves respond (Response). This method is used, for example, to configure the slaves or to query specific values from a slave selectively.

In the PDCM mode (Periodic Data Collection mode) the slaves transmit comparatively large amounts of data to the master within a specified time slot, wherein the transmission activity of the master is confined to providing the slaves with a reference point for determining this time slot by means of a synchronization signal (Broadcast Read Command). The slaves have already been equipped with information about their respective time slot in advance, so that they respond to the synchronization signal by determining their respective transmission time interval, on the basis of which they can send their sensor data to the master.

In the power phase, comparatively large amounts of electrical energy are transmitted in order to supply the slaves having high energy consumption with sufficient energy.

The above-mentioned Signal Function Class in accordance with the above-mentioned specification is used primarily for the connection of slaves having low energy consumption and a comparatively high volume of data needing to be sent from the slave to the master. After a sensor arrangement of the Signal Function Class is commissioned a phase of the communication between the master and the slave first takes place in the CRM mode, during which the slave is usually configured, for example in relation to the parameters of the above-mentioned PDCM time slot for this slave. Once this phase is completed the sensor arrangement changes over to the PDCM mode, in which the slaves always respond to the synchronization signal of the master by transmitting the acquired data to the central entity in the respectively assigned time slot. This phase in the PDCM mode is usually not exited again until the operation of the sensor arrangement is interrupted. A power phase is not provided in accordance with the Signal Function Class, and is also not required on account of the low energy consumption of the slaves.

The above-mentioned Power Function Class is used primarily for the connection of slaves having comparatively high energy consumption and a comparatively low volume of data needing to be sent from the master to the slave. During the operation of a sensor arrangement of the Power Function Class, phases of the communication between the master and the slave in the CRM mode on the one hand take place alternately with power phases on the other hand. The durations of the power phases are usually highly predominant. Supplying a comparatively large amount of energy to the slaves in these phases at a higher voltage compared to the CRM mode means, in particular, that actuators can be operated, wherein this is usually carried out on the basis of control commands transmitted previously from the master to the slaves in the CRM phase. The PDCM mode is not used in accordance with the Power Function Class, because it is also not required with the above-mentioned actuators, due to the low volume of data.

In the PDCM mode the data transmission follows a fixed schema, specified by the master. This generally involves each slave being assigned a fixed time slot, i.e. a specified period of time relative to a synchronization signal sent by the master, in which data can be transmitted from the respective slave to the master.

Today's parking aid systems based on ultrasound technology in motor vehicles are increasingly being integrated into functions that go beyond the classic parking process. In addition to the cross-functional use of these sensors, such as for automatic braking processes, the reliability and safety classification with regard to an ASIL classification (ASIL="Automotive Safety Integrity Level") play an increasingly important role. In this regard, reference is also made to the standard ISO 26262: 2011 "Road vehicles—functional safety", which represents an internationally valid standard in the automotive sector for electrical and electronic systems of motor vehicles. The ASIL classification is a risk classification system defined in the aforementioned standard in which an ASIL level can be determined for certain situations or circumstances by using three parameters, various classes being able to be derived from said ASIL level, referring among other things to permissible failure probabilities:

ASIL A: recommended failure probability less than $10^{-6}$/hour

ASIL B: recommended failure probability less than $10^{-7}$/hour

ASIL C: required failure probability less than $10^{-7}$/hour

ASIL D: required failure probability less than $10^{-8}$/hour

The ASIL levels A, B, C and D have corresponding requirements for the respective system. In the event that the motor vehicle does not accelerate despite a corresponding request from the driver, only ASIL B applies, for example, while ASIL D generally applies to systems for fully autonomous driving.

Such functions and in particular also functions based on artificial neural networks (ANNs) require a large amount of data to be transmitted from the sensors (slaves) to the control unit (ECU—"Electronic Control Unit") that contains the central processing unit (master). Regular operation of such a sensor arrangement using an ANN would no longer be guaranteed, for example, if the payload data rate that can be achieved when transmitting the data from the sensors to the central processing unit is insufficient to transmit all the data required for reliable operation of the ANN to the central processing unit quickly enough. In particular, the ANN may in principle also still be ready for use with a smaller amount of data available. However, it must then be expected that the reliability of the output data of the ANN will decrease, so that a specified ASIL level may not be able to be maintained.

WO 2016/054345 A1 describes an ultrasound system for monitoring the condition or the integrity of a structure, such as is used in the oil, gas or power generation industry, for example. The system comprises a plurality of ultrasonic sensors and at least one digital sensor interface.

DE 10 2013 226 376 A1 describes a method for operating a sensor system with an ultrasonic sensor and a control unit, wherein data are transmitted from the ultrasonic sensor to the control unit on a current-modulated basis and data are transmitted from the control unit to the ultrasonic sensor on a voltage-modulated basis. After modification of an appropriate PSI5 data bus interface, this solution allows just such a data bus and a LIN data bus to be combined with one another for data transmission to exploit the advantages of both bus systems.

DE 10 2012 103 907 A1 describes a method for operating a receiving unit of a motor vehicle control unit connected to a transmitting unit. The receiving unit adds an identifier to the received signal, which identifier contains a virtual address for the transmitting unit. This can be used to connect a sensor unit according to the PSI5 Version1 standard to a motor vehicle control unit that processes signals in the PSI Version2 standard.

Finally, EP 2 263 102 B1 describes an ultrasound-based driver assistance system having multiple sensors. The sensors are each assigned an individual identification code, which is readable by a control unit via an interface. The interface is a 2-wire bus interface designed to comply with a Peripheral Sensor Interface (PSI).

It is the object of the invention to provide such a method for operating a sensor arrangement in a motor vehicle in which communication between the master and the slaves is regularly possible at a high payload data rate while at the same time ensuring a predetermined ASIL level.

This object is achieved by the subjects of the independent patent claims. Preferred developments of the inventions are described in the subclaims.

According to the invention there is therefore provision for a method for operating a sensor arrangement in a motor vehicle on the basis of a DSI protocol, wherein
  the sensor arrangement has a central processing unit as a master and a plurality of sensor units as slaves controlled by the master,
  the central processing unit and the sensor units are connected to a bus line and
  communication between the central processing unit and the sensor units takes place via the bus line,
  characterized by the following method steps:
  sending a first message from the central processing unit to a first sensor and subsequently
  sending a second message from the central processing unit to a second sensor without the central processing unit waiting to receive a response message from the first sensor.

If it is said in the present case that a method based on a DSI protocol is involved, this means that the method uses the DSI protocol, but not that the method has to fully comply with the DSI3 standard. Rather, the method can go beyond the standard or extend it. A configurable mode for the DSI3 standard is provided in the present case that can be used to send messages to the various sensors very effectively, namely in a short time. This mode can be selected for certain situations in order to switch back to a conventional mode afterwards.

According to a preferred development of the invention, there is provision for the sending of the second message to be started immediately after the sending of the first message has been completed. Thus, even if there is a response message after the first message has been sent, receipt of such a response message is not awaited. Rather, the second message is sent independently of the receipt of such a response message directly after the first message has been sent. Furthermore, it preferably holds that the first sensor does not send a response message on receiving the first message. This provides a mode that, in contrast to the CRM mode described above, saves time by dispensing with a response message for a message received by a sensor or by at least not waiting for such a response message to be received.

There is preferably provision for the following method step, which follows the sending of the second message:
  sending a further message from the central processing unit to another sensor without the central processing unit waiting to receive a response message from the sensor to which a message has been sent directly beforehand. In this case too, there is advantage in an embodiment according to which the sending of the further message is started immediately after the sending of the message sent directly beforehand has been completed. Furthermore, it preferably holds that the sensor to which a message has been sent directly beforehand does not send a response message for the message it has received.

According to a preferred development of the invention, this method is continued for further sensors. The method is preferably designed in such a way that the method step of sending a further message from the central processing unit to another sensor without the central processing unit waiting to receive a response message from the sensor to which a message has been sent directly beforehand is repeated at least once for yet another sensor.

The messages sent from the central processing unit to the sensors can in principle comprise various payload data. However, it is preferable for the messages sent from the central processing unit to the sensors to contain configuration commands for the individual sensors.

According to a preferred development of the invention, there is finally provision for the following method step, which precedes the sending of the first message:
  sending a message from the central processing unit to the sensors prohibiting the sensors from sending a response message for a message received from the central processing unit. This switches the entire system to a mode that, unlike the CRM mode, does not save time by not requiring response messages from the sensors, but rather prohibits them.

According to the invention, there is provision for the use of a method as described above in a motor vehicle.

In addition, the invention also relates to a non-volatile, computer-readable storage medium having instructions stored thereon that, when executed on a processor, implement a method as described above.

The invention also relates to a sensor arrangement that is set up for operation by means of a method as described above. The sensor arrangement preferably has ultrasonic sensor units for sending and/or receiving ultrasonic signals as sensor units.

It is therefore within the scope of the invention for the master to prescribe, for example by means of a configuration message from the master to all slaves, a behavior for all slaves such that no response is sent for received messages. As a result, both the master and the slaves know whether there is a CRM mode, in which a response message ("Response") from the slaves is required, or a mode without a response message from the slaves. The mode without a response message allows rapid sequential arrangement of multiple messages from the master to the slaves.

This allows the slaves to be configured quickly, thereby allowing the entire system to be ready for use quickly. In addition, one advantage is a reduced power consumption, since no response messages need to be generated. Finally, it is also advantageous that, in the case of an application-specific integrated circuit (ASIC) as the master, the master does not need any additional memory for response messages from the slaves, which means that it can be produced cheaply and easily. This is particularly advantageous with ultrasonic sensors, since these sensors require a lot of configuration data compared to others, sometimes even during the measurement, and, due to the propagation time of sound in air, have comparatively slow measurement cycles.

The invention is explained in more detail below with reference to the drawings using a preferred exemplary embodiment. The features described can represent an aspect of the invention both individually and in combination.

Figure 2:
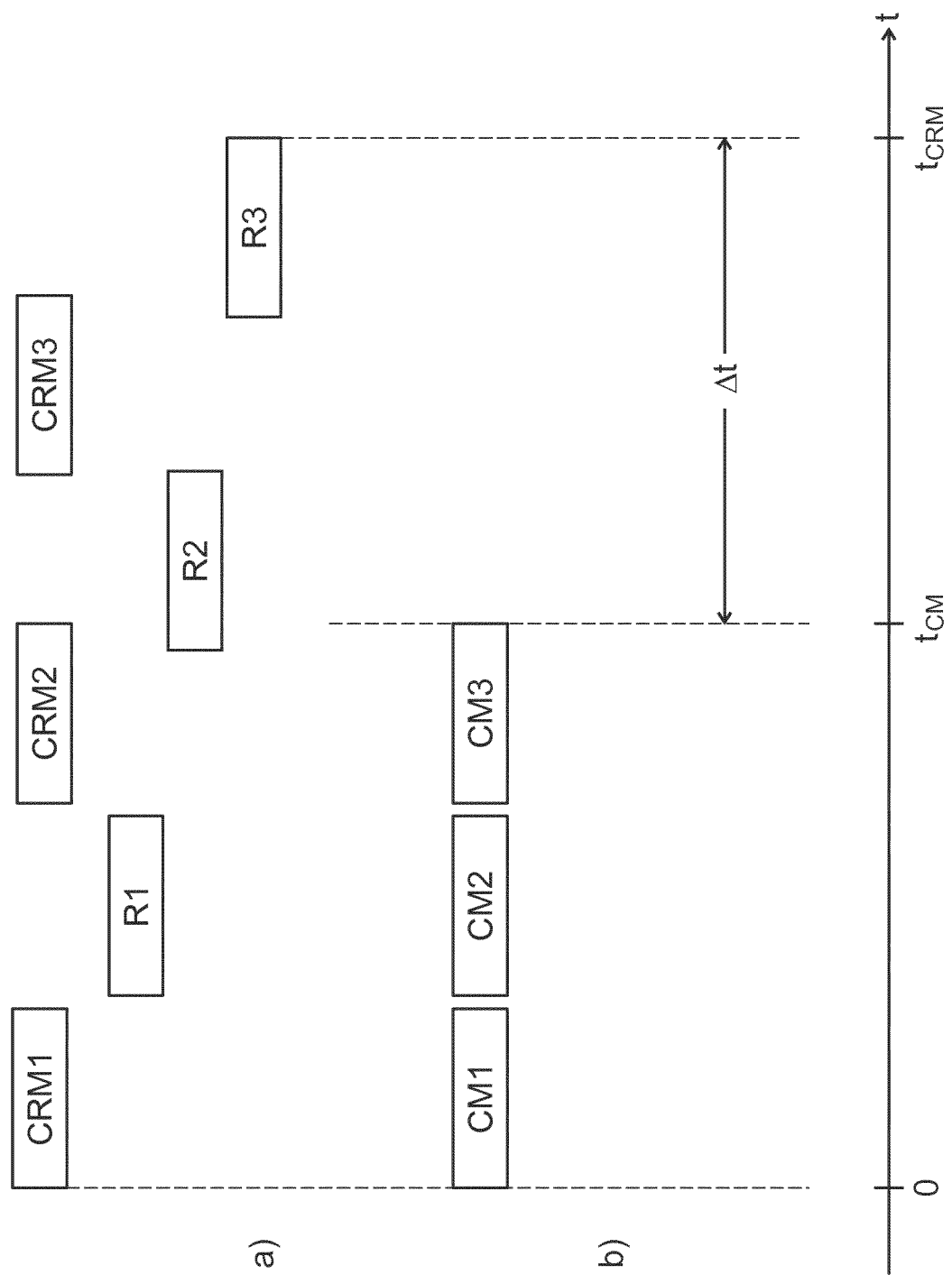

In the drawings:

FIG. 1 schematically shows a vehicle with a sensor arrangement according to a preferred exemplary embodiment of the invention with a central processing unit as a master and three sensor units as slaves in a daisy-chain configuration and FIG. 2 schematically show a comparison of the CRM mode with a communication mode according to an exemplary embodiment of the invention in which the central processing unit communicates with sensors without the sensors sending response messages.

FIG. 1 schematically shows a vehicle 1 having a sensor arrangement according to a preferred exemplary embodiment of the invention. The sensor arrangement 2 has a central processing unit 3 and three sensor units S1, S2 and S3. The master 3 and the sensor units S1, S2, S3 are connected to each other by means of a bus line 4, which is in the form of a two-wire line. Furthermore, it holds that the three sensor units S1, S2, S3 and the central processing unit 3 are connected in series with one another, that is to say in what is known as a daisy-chain configuration.

The central processing unit 3 is a master as defined by the above-mentioned DSI3 specification, which is connected via the bus line 4 to the three sensor units S1, S2, S3, which act as slaves as defined by the DSI3 specification, so that overall a bus as defined by the DSI3 specification is present. Furthermore, the sensor units S1, S2, S3 are ultrasonic sensor units for sending and/or receiving ultrasonic signals, which represent ultrasonic sensor units of a parking assistance system.

Communication between the central processing unit 3 and the sensor units S1, S2, S3 takes place in the present case in a mode in which, as can be seen from FIG. 1, the central processing unit 3 sends commands F1, F2, F3 to the sensor units S1, S2, S3.

The mode according to the preferred exemplary embodiment of the invention being described in the present case, in which messages are sent from the central processing unit 3 to the sensor units S1, S2, S3, differs significantly from the CRM mode as described earlier on. Reference is made to FIG. 2 in this regard.

Section (a) of FIG. 2 shows the communication between the central processing unit 3 and the sensor units S1, S2, S3 according to a conventional CRM mode. The depiction shows the chronological sequence for how the central processing unit 3 sends CRM messages CRM1, CRM2 and CRM3 to the sensor units S1, S2, S3, with a pause in each case between the CRM messages CRM1, CRM2, CRM3. In these pauses, responses R1, R2, R3 are returned to the central processing unit by a respective sensor unit S1, S2, S3. These responses R1, R2, R3 can be, for example, confirmations that a command sent from the central processing unit 3 to the sensors S1, S2, S3 has been understood. The responses R1, R2, R3 can, however, also provide information about data that have been captured by the sensors S1, S2, S3. All in all, the communication for sending the messages CRM1, CRM2, CRM3 and the responses R1, R2, R3 takes the time $t_{crm}$.

Section (h) of FIG. 2 depicts the mode according to the preferred embodiment of the invention being described in the present case. It can be seen that here only messages CM1, CM2, CM3 are sent by the central processing unit 3, which are not answered by the sensors S1 S2. S3. There are therefore no response messages that would need to be recorded by the central processing unit 3. The messages CM1, CM2, CM3 can therefore be sent immediately one after the other. This takes the time $t_{CM}$ in total, which means that Δt less time is required for sending the messages CM1, CM2, CM3 from the central processing unit 3 to the sensors S1, S2, S3 than in the CRM mode depicted in section (a) of FIG. 2.

A fundamental aspect of the preferred exemplary embodiment of the invention being described in the present case is thus also that the messages CM1, CM2, CM3 sent to the sensors S1, S2, S3 are actually only ever intended for a single sensor S1, S2, S3. This means that the message CM1 from the central processing unit 3 is intended for the sensor S1, the message CM2 from the central processing unit 3 is intended for the sensor S2 and the message CM3 from the central processing unit 3 is intended for the sensor S3. This also distinguishes the mode described here and the messages sent by the central processing unit 3 from a situation provided for in the DSI3 standard in which a command referred to as "Global Command" can be sent from the central processing unit 3 to all sensors S1, S2, S3 at the same time without the sensors S1, S2, S3 responding. This "Global Command" command thus does not allow the sensors S1, S2, S3 to be addressed individually. This is also shown by the fact that the "Global Command" command is always linked to the address "0" (ie "to all").

Overall, the mode of the preferred exemplary embodiment of the invention being described in the present case thus allows fast, individual configuration of the sensors S1, S2, S3, which also allows the entire sensor arrangement 2 to be ready for use quickly. As no response messages need to be generated by the sensors S1, S2, S3, the power consumption is also reduced, which means that all in all an efficient option is provided in cases in which a response from the sensors S1, S2, S3 can be dispensed with to ensure that these sensors S1, S2, S3 are addressed quickly.

LIST OF REFERENCE SIGNS 1 motor vehicle
2 sensor arrangement 3 central processing unit
4 bus line
S1 sensor unit
S2 sensor unit
S3 sensor unit

The invention claimed is:

1. A method for operating a sensor arrangement in a motor vehicle on the basis of a DSI protocol, wherein the sensor arrangement has a central processing unit as a master and a plurality of sensor units as slaves controlled by the master, the central processing unit and the sensor units are connected to a bus line, and communication between the central processing unit and the sensor units takes place via the bus line, the method comprising:
    sending a first message from the central processing unit to a first sensor and subsequently;
    sending a second message from the central processing unit to a second sensor without receiving at the central processing unit a response message from the first sensor,
    wherein the sending of the second message is started immediately after the sending of the first message has been completed.

2. The method according to claim 1, wherein the first sensor does not send a response message on receiving the first message.

3. The method according to claim 1, further comprising, following the sending of the second message:
    sending a further message from the central processing unit to another sensor without receiving at the central processing unit a response message from the sensor to which a message has been sent directly beforehand.

4. The method according to claim 3, wherein the sending of the further message is started immediately after the sending of the message sent directly beforehand has been completed.

5. The method according to claim 3, wherein the sensor to which a message has been sent directly beforehand does not send a response message for the message it has received.

6. The method according to claim 3, further comprising:
    sending a further message from the central processing unit to another sensor without receiving at the central processing unit a response message from the sensor to which a message has been sent directly beforehand is repeated at least once for yet another sensor.

7. The method according to claim 1, wherein the messages sent from the central processing unit to the sensors contain configuration commands for the individual sensors.

8. The method according to claim 1, further comprising, preceding the sending of the first message:
    sending a message from the central processing unit to the sensors prohibiting the sensors from sending a response message for a message received from the central processing unit.

9. The method according to claim 1, wherein the method is implemented in a motor vehicle.

10. A non-transitory computer-readable storage medium having commands stored thereon that, when executed on a processor, implement a method according to claim 1.

11. A sensor arrangement configured for operation by a method according to claim 1.

12. The sensor arrangement according to claim 11, comprising: ultrasonic sensor units for sending and/or receiving ultrasonic signals as sensor units.

* * * * *